(12) United States Patent
Lim et al.

(10) Patent No.: US 8,415,830 B2
(45) Date of Patent: Apr. 9, 2013

(54) ACTIVE LOAD MANAGEMENT SYSTEM

(75) Inventors: Sie Teong Lim, Brookfield, WI (US); Brandon M. Batzler, Hartford, WI (US); Kenny J. Stair, North Prairie, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 73 days.

(21) Appl. No.: 12/792,937

(22) Filed: Jun. 3, 2010

(65) Prior Publication Data
US 2011/0298285 A1 Dec. 8, 2011

(51) Int. Cl.
*H02J 3/14* (2006.01)
(52) U.S. Cl. ............... 307/41; 307/39; 307/40; 361/90; 363/95
(58) Field of Classification Search .............. 307/39–41; 361/90; 363/95
See application file for complete search history.

(56) References Cited

U.S. PATENT DOCUMENTS

| | | | | |
|---|---|---|---|---|
| 4,031,406 A * | 6/1977 | Leyde et al. | ............... | 307/41 |
| 4,066,913 A * | 1/1978 | Manning et al. | ............... | 307/38 |
| 4,181,950 A * | 1/1980 | Carter, II | ............... | 700/291 |
| 4,228,364 A * | 10/1980 | Walden | ............... | 307/38 |
| 4,324,987 A * | 4/1982 | Sullivan et al. | ............... | 307/35 |
| 4,336,462 A * | 6/1982 | Hedges et al. | ............... | 307/35 |
| 4,551,812 A * | 11/1985 | Gurr et al. | ............... | 700/295 |
| 4,890,212 A * | 12/1989 | Kumon et al. | ............... | 363/49 |
| 4,916,328 A * | 4/1990 | Culp, III | ............... | 307/39 |
| 5,414,640 A * | 5/1995 | Seem | ............... | 700/291 |
| 5,455,760 A * | 10/1995 | Bilas et al. | ............... | 700/22 |
| 5,536,976 A * | 7/1996 | Churchill | ............... | 307/11 |
| 5,543,667 A * | 8/1996 | Shavit et al. | ............... | 307/39 |
| 5,754,445 A * | 5/1998 | Jouper et al. | ............... | 700/295 |
| 5,861,683 A * | 1/1999 | Engel et al. | ............... | 307/38 |
| 5,927,598 A * | 7/1999 | Broe | ............... | 236/46 R |
| 5,986,353 A * | 11/1999 | Kohler | ............... | 307/38 |
| 6,028,373 A * | 2/2000 | Kim et al. | ............... | 307/31 |
| 6,046,513 A * | 4/2000 | Jouper et al. | ............... | 307/31 |
| 6,066,897 A * | 5/2000 | Nakamura | ............... | 290/4 A |
| 6,172,432 B1 * | 1/2001 | Schnackenberg et al. | ...... | 307/23 |
| 6,285,178 B1 * | 9/2001 | Ball et al. | ............... | 323/351 |
| 6,531,791 B2 * | 3/2003 | Ekelund et al. | ............... | 307/66 |
| 6,583,521 B1 * | 6/2003 | Lagod et al. | ............... | 307/70 |
| 6,590,304 B1 * | 7/2003 | Manning et al. | ............... | 307/131 |
| 7,010,363 B2 * | 3/2006 | Donnelly et al. | ............... | 700/19 |
| 7,015,599 B2 * | 3/2006 | Gull et al. | ............... | 307/85 |
| 7,053,497 B2 * | 5/2006 | Sodemann et al. | ............... | 290/1 A |
| 7,104,847 B2 * | 9/2006 | Sodemann et al. | ............... | 439/638 |
| 7,119,457 B1 * | 10/2006 | Flegel | ............... | 307/64 |

(Continued)

OTHER PUBLICATIONS

"100/200 Amp Automatic Transfer Switch", Installation & Operator's Manual, Briggs & Stratton, 2010, pp. 1-20.

*Primary Examiner* — Jared Fureman
*Assistant Examiner* — Alfonso Perez Borroto
(74) *Attorney, Agent, or Firm* — Andrus, Sceales, Starke & Sawall, LLP

(57) ABSTRACT

A method and system for managing loads powered by a standby generator. The method includes utilizing a transfer switch control unit to selectively shed loads each associated with one of a series of priority circuits. The loads are shed in a sequential order based upon the priority circuit to which the load is applied. Once a required load has been shed, the control unit determines whether any of the lower priority loads can be reconnected to the generator without exceeding the rating of the generator while one of the higher priority circuits remains open.

18 Claims, 4 Drawing Sheets

U.S. PATENT DOCUMENTS

| | | | |
|---|---|---|---|
| 7,161,253 B2 * | 1/2007 | Sodemann et al. | 290/1 A |
| 7,356,384 B2 * | 4/2008 | Gull et al. | 700/295 |
| 7,390,224 B2 * | 6/2008 | Sodemann et al. | 439/638 |
| 7,418,314 B2 * | 8/2008 | Rasmussen et al. | 700/286 |
| 7,446,432 B2 * | 11/2008 | Cha | 307/64 |
| 7,446,437 B2 * | 11/2008 | Paik et al. | 307/115 |
| 7,463,935 B1 * | 12/2008 | Miller et al. | 700/1 |
| 7,471,505 B2 | 12/2008 | Gull et al. | |
| 7,514,815 B2 * | 4/2009 | Paik et al. | 307/64 |
| 7,786,617 B2 * | 8/2010 | Paik et al. | 307/64 |
| 7,786,618 B2 * | 8/2010 | Cohen et al. | 307/65 |
| 7,929,327 B2 * | 4/2011 | Haines et al. | 363/95 |
| 7,932,480 B2 * | 4/2011 | Gu et al. | 219/482 |
| 7,948,117 B2 * | 5/2011 | Lathrop et al. | 307/64 |
| 7,949,615 B2 * | 5/2011 | Ehlers et al. | 705/412 |
| D644,993 S * | 9/2011 | Van Deursen | D13/116 |
| 8,018,219 B2 * | 9/2011 | Calcaterra et al. | 324/66 |
| 8,103,387 B2 * | 1/2012 | Gothard | 700/286 |
| 2001/0019226 A1 * | 9/2001 | Ekelund et al. | 307/29 |
| 2002/0024332 A1 * | 2/2002 | Gardner | 324/103 R |
| 2003/0075982 A1 * | 4/2003 | Seefeldt | 307/29 |
| 2005/0107892 A1 * | 5/2005 | Matsui et al. | 700/28 |
| 2005/0200205 A1 * | 9/2005 | Winn et al. | 307/64 |
| 2006/0018069 A1 * | 1/2006 | Gull et al. | 361/90 |
| 2007/0103835 A1 * | 5/2007 | Sorenson | 361/114 |
| 2008/0309165 A1 * | 12/2008 | Hoshiba | 307/41 |
| 2009/0027932 A1 * | 1/2009 | Haines et al. | 363/95 |
| 2009/0096291 A1 * | 4/2009 | Gainville et al. | 307/41 |
| 2010/0315092 A1 * | 12/2010 | Nacson et al. | 324/510 |
| 2011/0054707 A1 * | 3/2011 | Batzler et al. | 700/286 |
| 2011/0175453 A1 * | 7/2011 | Batzler et al. | 307/68 |
| 2011/0254372 A1 * | 10/2011 | Haines et al. | 307/66 |
| 2011/0260473 A1 * | 10/2011 | Batzler et al. | 290/40 C |
| 2011/0298285 A1 * | 12/2011 | Lim et al. | 307/41 |
| 2012/0046794 A1 * | 2/2012 | Altimore et al. | 700/286 |

* cited by examiner

ACTIVE LOAD MANAGEMENT SYSTEM

BACKGROUND OF THE INVENTION

The present disclosure generally relates to a power management system. More specifically, the present disclosure relates to a power management system for managing the load applied to a standby generator.

When there is a power outage, backup power may be provided by a standby generator. In some cases, the standby generator is started automatically after detection of the power outage. A standby generator that is started automatically usually requires an automatic transfer switch to connect electrical loads to the generator rather than to the power supply. A combination of a standby generator and an automatic transfer switch is generally installed by trained personnel.

Since the power supply by the standby generator is limited by the size of the generator, the amperage rating of the generator can limit the types of and number of appliances that are connected to the standby generator during power outages. As an example, large appliances such as air conditioners, hot water heaters and on-demand appliances such as microwave ovens and toasters can draw a significant amount of power that in combination may exceed the rating limit for the standby generator.

Presently, automatic transfer switches are available that include a series of priority circuits that allow the automatic transfer switch to selectively reduce the load on the generator when the load approaches the rated limit for the generator. Typically, the priority circuits are assigned a value from 1 to a maximum number, such as 6 or 8, where the circuit assigned priority value 1 has the highest priority. When the load on the generator approaches the rating for the generator, the automatic transfer switch begins to shed load by opening switches or relays to disconnect the load connected to the lowest priority circuit. The automatic transfer switch continues to shed the loads from the lowest priority circuit to the highest priority circuit until the load reaches a preset limit to ensure that the generator can continue to provide power to the highest priority loads connected to the generator. When the load on the generator is reduced, load shedding ceases.

During initial installation of the standby generator and automatic transfer switch, installers connect dedicated loads to each of the priority circuits based upon a perceived importance of each of the loads. As an example, an air conditioner may be connected to priority circuit 1 where a less important load, such as a pool pump, may be connected to priority circuit 3. Thus, when the total load on the generator nears the rating for the generator, the pool pump connected to priority circuit 3 is shed before the air conditioner connected to priority circuit 1.

As described above, the priority circuits in currently available automatic transfer switches are hardwire connected at the time of installation. Therefore, if a user desires to change the device connected to priority circuit 1, the electrical wiring to the transfer switch must be adjusted.

SUMMARY OF THE INVENTION

The present disclosure relates to a power management system for managing the load applied to a standby generator. More specifically, the present disclosure relates to the operation of a control unit within a transfer switch to selectively shed load from a series of priority circuits to manage the amount of load applied to the standby generator during power interruption.

The system of the present disclosure includes a transfer switch positioned between a standby generator and a main breaker panel. When power is interrupted, the transfer switch activates the generator and disconnects the supply of electricity from the utility to the main breaker panel.

After the generator begins operation, the control unit within the transfer switch monitors the total load applied to the generator through both branch circuits and by electric loads assigned to one of a plurality of priority circuits. Each of the loads connected to the priority circuits are assigned a priority value from a lowest priority to a highest priority.

When the combined load on the generator reaches a maximum rating value for the generator, the control unit within the transfer switch begins to selectively disconnect electric loads from a generator in a sequential order based upon the priority value assigned to each of the electric loads. The control unit continues to shed loads starting with the lowest priority load and continuing to the highest priority load until the combined load on the generator again falls below a rated value for the generator.

Once the combined load on the generator falls below the rated value, the control unit determines whether any of the previously disconnected loads having a lower priority value can be reconnected without exceeding the rated value for the generator. As an example, if a water heater connected to the second highest priority circuit is disconnected, the control unit determines whether a pool pump or similar device connected to the third highest priority circuit could be reconnected without exceeding the rated value for the generator. If the third priority circuit can be reconnected, the control unit reconnects the third priority circuit while the second priority circuit remains disconnected. The control unit continues to reconnect lower priority electric loads as long as the combined load on the generator does not exceed the rated value for the generator.

In the manner described above, the control unit of the transfer switch optimizes the load on the generator while still maintaining the priority sequence described. During operation of the generator, the control unit of the transfer switch determines and stores the load drawn by each of the electric devices connected to the priority circuits. In this manner, the control unit can predict the additional load on the generator before each of the electric loads is reconnected out of the priority sequence order.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
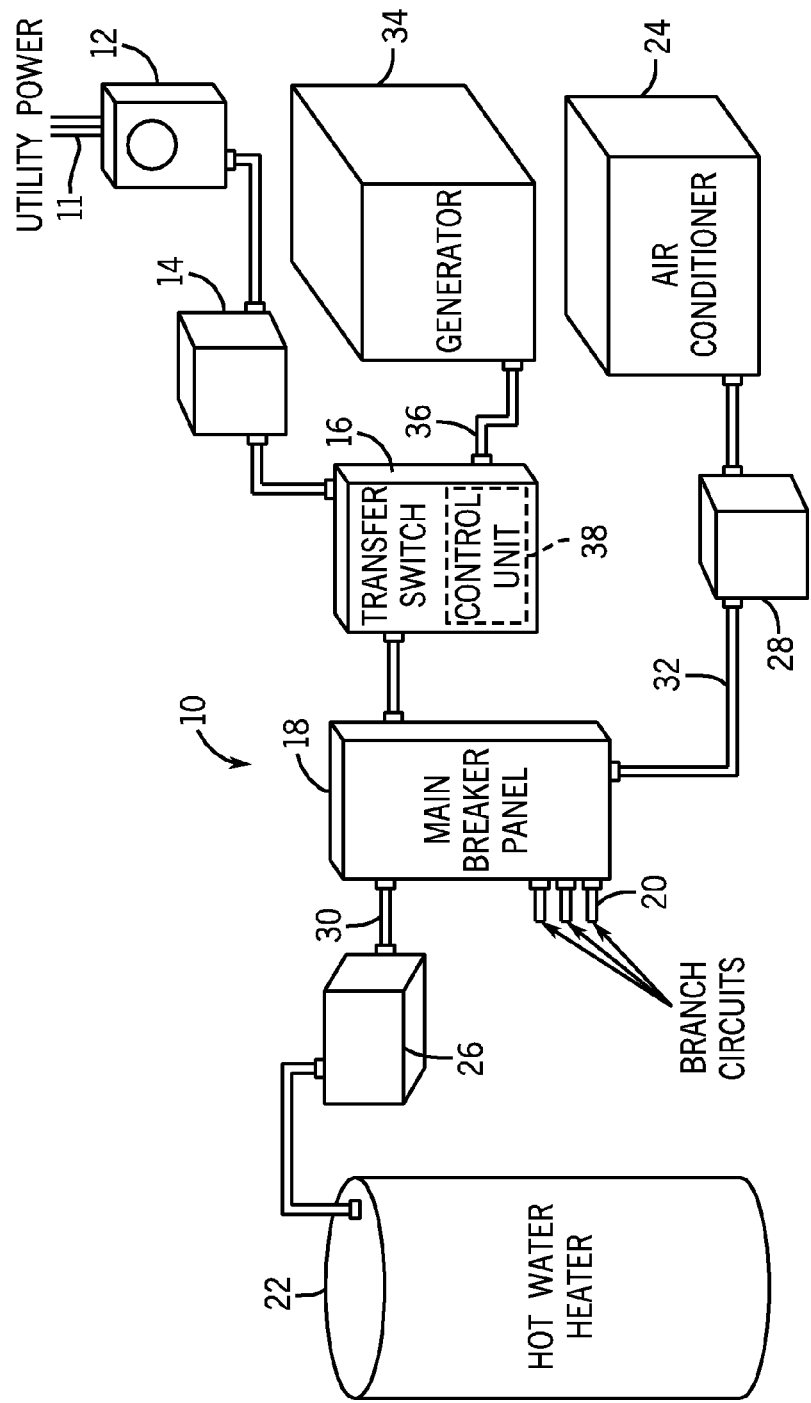
FIG. 1 is an electrical system having a load management system of the present disclosure.

FIG. 1 depicts a load management system 10. The load management system 10 includes a connection to a main power supply 11 through a meter 12. The power supply from the meter 12 is fed through an optional service disconnect switch 14 to a transfer switch 16. The transfer switch 16 carries out a series of functions, as will be described below and can also be referred to as a load-management controller. Throughout the following disclosure, the term "transfer switch" will be utilized with the understanding that the transfer switch 16 could also be referred to as a load-management device.

The transfer switch 16 feeds electrical power to a main breaker panel 18 for the residence. The main breaker panel 18 includes a series of individual branch circuits 20 to provide electrical power to normal loads included in a residence, such as the lights, power outlets, etc.

In addition to the branch circuits 20, several high power consumption loads, such as a hot water heater 22 and air conditioner 24, are connected to the main breaker panel 18 through separate interconnect devices, such as the remote contactors 26, 28. Each of the contactors 26, 28 is shown in FIG. 1 as receiving a signal along lines 30, 32 from the transfer switch 16. The high power consumption loads can be disconnected from the power supply through the contactors 26, 28, as will be described.

Although remote contactors 26, 28 are illustrated in FIG. 1 as controlling the supply of power to each of the high power consumption loads, it is contemplated that different types of interconnect device could be utilized. As one example, instead of utilizing the remote contactors 26, 28, the transfer switch 16 could include internal relays that can be selectively opened or closed to supply power to the high power consumption loads, such as the hot water heater 22 or the air conditioner 24. Throughout the remaining portions of the disclosure, remote contactors will be shown and described. However, it should be understood that different types of interconnect devices, such as internal relays within the transfer switch 16, could be utilized while operating within the scope of the present disclosure.

The transfer switch 16 is connected to a standby generator 34 through connection 36. As is well known, when the supply of power from the utility is interrupted, a control unit within the transfer switch 16 senses the interruption of power. The transfer switch 16 sends a signal to turn on the standby generator 34 and controls switches in the transfer switch 16 to direct the supply of electricity generated by the standby generator 34 to the main breaker panel 18. When the connection is made between the generator 34 and the main breaker panel 18, the connection between the utility power supply 11 and the main breaker panel 18 is disrupted such that electricity is supplied only by the standby generator 34.

Figure 2:
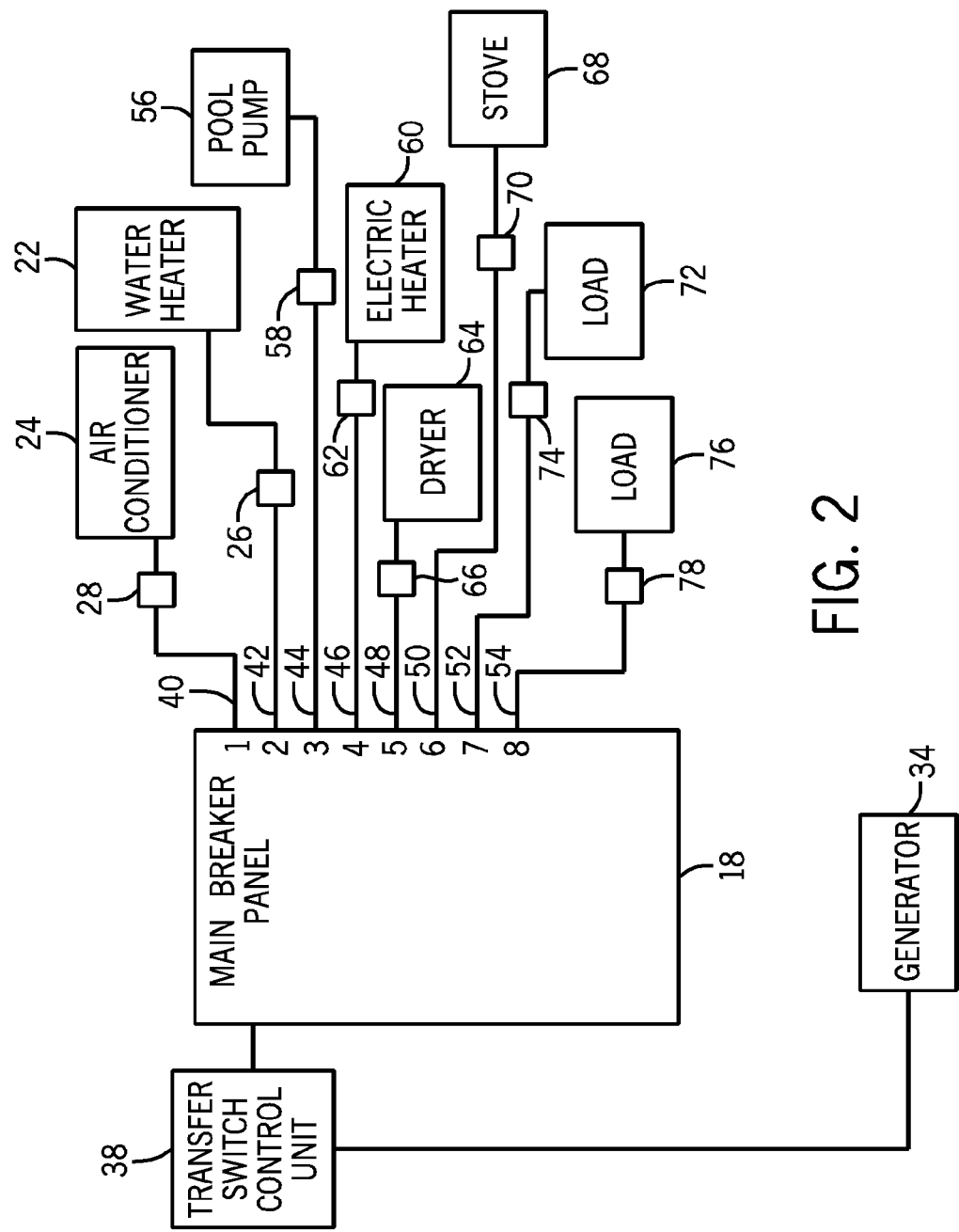
FIG. 2 is a schematic illustration of the priority circuits controlled by the transfer switch control board.

Referring now to FIG. 2, a control unit 38 of the transfer switch is shown connected to the main breaker panel 18. The control unit 38 can include any type of microcontroller that can be programmed to control the operation of various different functions of the transfer switch as is well known. In the embodiment shown in FIG. 2, only several of the connections to the main breaker panel 18 are illustrated. However, it should be understood that various other operative connections are included in the transfer switch control unit 38 and the main breaker panel 18.

The control unit 38 controls the supply of power from the standby generator to a plurality of priority circuits through a series of control outputs of the main breaker panel 18, numbered 1-8 in FIG. 2. In the embodiment shown in FIGS. 1 and 2, the control unit 38 can send separate the control outputs to the contactors 26, 28 shown in FIG. 1. The contactors 26, 28 each include a relay circuit that can be selectively opened or closed by the transfer switch control unit 38 to selectively allow power to be supplied to the hot water heater 22 or the air conditioner 24 shown in FIG. 1. As previously described, the remote contactors 26, 28 could be replaced by internal relays contained within the main breaker panel 18 and operated by the control unit 38.

In the embodiment shown in FIG. 2, the air conditioner 24 is connected to the first priority output 40 through the contactor 28. Water heater 22 is connected to the second priority output 42 through the contactor 26. In the embodiment illustrated, pool pump 56 is connected to the third priority output 44 through contactor 58. An electric baseboard heater 60 is connected to the fourth priority output 46 through the contactor 62. A dryer 64 is connected to the fifth priority output 48 through contactor 66. Stove 68 is connected to the sixth priority output 50 through contactor 70. Load 72 is connected to the seventh priority output 52 through the contactor 74. Finally, load 76 is connected to the eighth priority output 54 through the contactor 78.

As illustrated in FIG. 2, the transfer switch control unit 38 controls eight priority outputs (40-54) of the main breaker panel 18 such that a total of eight individual loads can be controlled by the transfer switch control unit 38 through the priority outputs (40-54). Although eight individual priority outputs are shown in the embodiment of FIG. 2, it should be understood that the transfer switch control unit 38 could be designed having fewer or more priority outputs while operating within the scope of the present disclosure.

When electrical power is interrupted, the standby generator 34 begins to operate and supplies electric power to the transfer switch. When electric power is being supplied by the standby generator, the transfer switch control unit 38 monitors the operation of the standby generator 34 to determine the amount of power being generated by the standby generator 34 as well as the total combined load seen by the generator, which includes not only the priority circuits but also all of the loads. When the transfer switch control unit 38 detects a combined current draw from all of the loads that approaches a first percentage amount of the rated load capacity for the standby generator 34, the transfer switch control unit begins to shed loads in a manner to be described. As an example, when the load reaches approximately 85% of the rating for the standby generator 34, the transfer switch control unit 38 begins to shed loads, as will be described.

During normal operating conditions of the standby generator, when the combined load calculated by the transfer switch control unit 38 approaches the rated percentage amount for the standby generator, the transfer switch control unit initially begins to shed load by first shedding the lowest priority load 76 connected to the eighth priority output 54 through the contactor 78. Once load 76 has been shed, the transfer switch control unit again monitors for the current draw. If the current draw still exceeds the allowable threshold, the next lowest priority load 72 connected to the seventh priority output 52 is shed. This process continues until enough load is shed to bring the combined load on the generator below the rated value for the generator. As can be understood in FIG. 2, the highest priority load, which in the embodiment of FIG. 2 is air conditioner 24, is connected to the first priority output 40. The second highest priority load, namely water heater 22, is connected to the second priority output 44. Thus, when the load on the standby generator 34 exceeds the rated value, the transfer switch control unit 38 begins to sequentially shed loads from the eighth priority output 54 to the first priority output 40. Therefore, during initial installation of the contactors, the individual loads are assigned a priority number by the installer/owner.

As described above, any one of the loads can be shed by simply sending a signal from the transfer switch control unit 38 to the contactor associated with the load to cause a relay to open to interrupt power supply from the generator 34 to the individual load. Once the combined load on the generator 34 falls below the rated value, the relays contained in each of the contactors can be closed in a reverse priority order such that current from the generator is again supplied to the electric loads.

As an example, the preset maximum amount of load on the standby generator 34 is 85%, although other percentages can be used. When the total current draw drops far enough below the 85% preset maximum, additional loads can be added to the generator 34.

Figure 4:
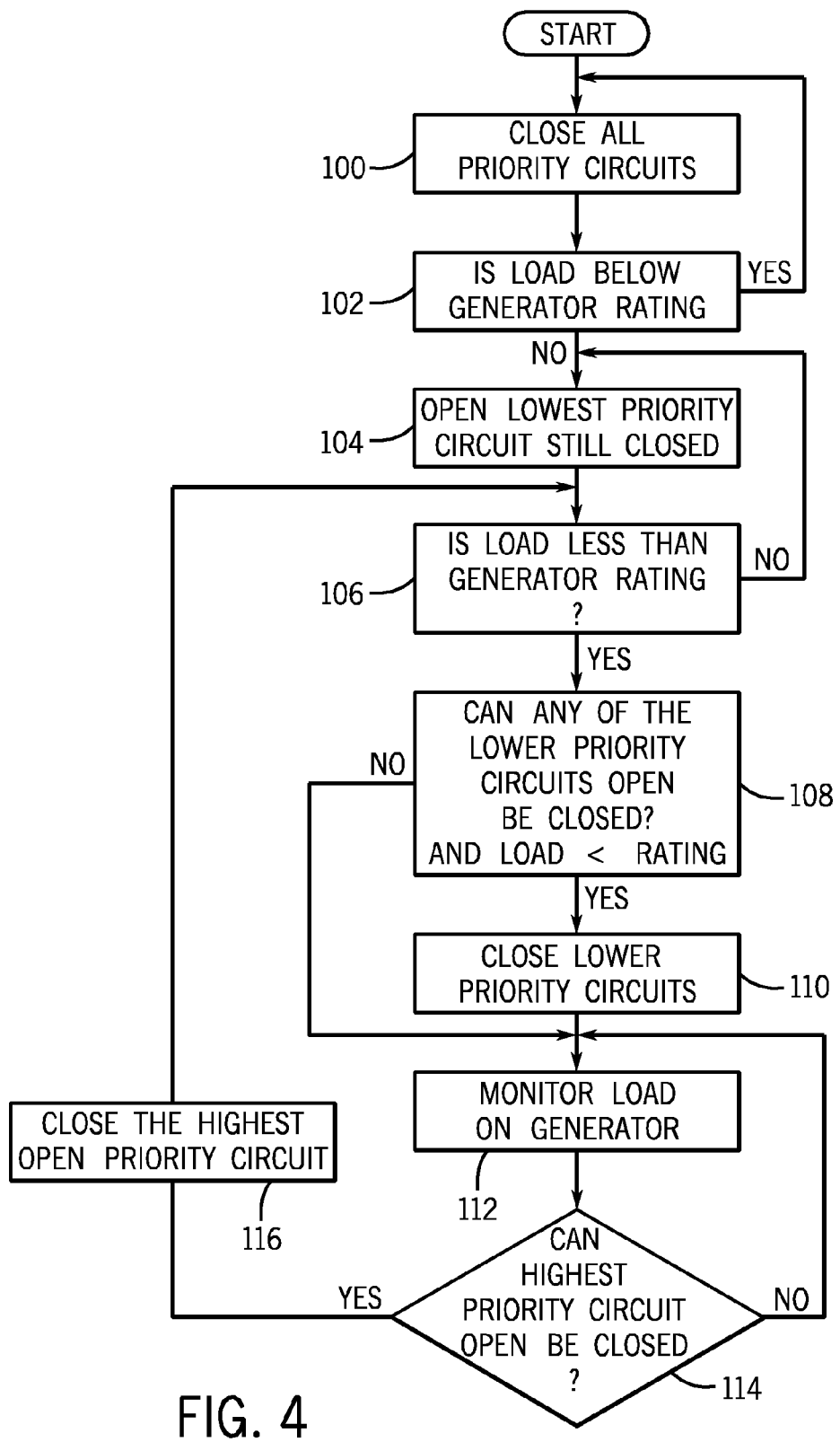
FIG. 4 is a flowchart illustrating the processing carried out by the transfer switch control board.

Although the priority outputs are designated in a priority sequence from the highest priority value of 1 to the lowest priority value of 8 in FIG. 2, the transfer switch control unit 38 operating in accordance with the present disclosure can modify the typical manner in which loads are shed, as will be described with reference to the flowchart of FIG. 4.

Initially, in step 100, all of the relays associated with each of the priority output lines 1-8 are closed, as indicated in step 100. The relays remain closed until the preset maximum load on the standby generator is reached.

Upon power interruption and activation of the standby generator, the control unit determines in step 102 whether the total load for a combination of all of the priority output circuits as well as the load distributed through the branch circuits 20 connected to the main breaker panel 18 in FIG. 1 is less than the generator rating. As indicated previously, the generator is typically operated at a percent of its maximum, such as 85% as described.

If the current load on the generator is less than the rating, the transfer switch control unit continues to maintain all of the priority output circuits in a closed position such that power from the generator is supplied to each of the priority loads. However, if the system determines in step 102 that the combined load is no longer below the generator rating, the system begins to shed load by initially opening the relay associated with the lowest priority circuit still closed. In the embodiment of FIG. 2, the system first opens the contactor 78 on the eighth priority output 54, as indicated by step 104 of FIG. 4. As previously indicated, the system begins shedding loads connected to the lowest priority output 54.

After the first load is shed in step 104, the system determines in step 106 whether the total load on the generator is now below the generator rating. If the total load is not below the generator rating, the system will return to step 104 and shed the next lowest priority load on the seventh priority output 52. This sequence continues until the transfer switch control unit has opened the required number of priority circuits to decrease the load on the generator below the generator rating. As an example, the transfer switch control unit may need to open the relays associated with priority outputs 5-8 to bring the total load on the generator below the generator rating.

Once enough of the load has been shed, the system determines in step 106 that the load is less than the generator rating. In prior systems, the transfer switch control unit would take no additional steps with respect to the lower priority loads and would only close the lower priority loads when the load on the generator was decreased.

However, in accordance with the present disclosure, the transfer switch control unit determines in step 108 whether any of the previously opened lower priority circuits can be opened. As an example, if the last priority circuit opened was the second priority circuit 42 connected to the water heater 22 in FIG. 2, the control unit will then determine whether the pool pump 56 connected to the third priority output 44 could be closed based on the smaller amount of power drawn by the pool pump 56 as compared to the water heater 22.

During operation, the transfer switch control unit 38 learns and stores the amount of power drawn by each of the loads shown in FIG. 2. Thus, the transfer switch control unit can predict the current load that will be drawn by the pool pump 56. If the additional load drawn by the pool pump 56 will not cause the total load to exceed the generator rating, the transfer switch control unit will close the contactor 58 and allow power to be supplied to the pool pump 56, as shown by step 110 of FIG. 4. Additionally, if the transfer switch control unit determines that any of the loads 60, 64, 68, 72 or 76 can also be connected to the generator, the control unit will close the relay associated with each individual load. As can be understood by the above description, even though electrical power is interrupted to the water heater 22 connected to the second priority output 42, the system may supply power to lower priority loads if the lower priority loads can be activated without exceeding the generator rating, as indicated by step 114.

Once the desired priority circuits are closed, the system continues to monitor the load on the generator, as shown in step 112. In step 114, the system determines whether the highest priority circuit that is open can be closed without exceeding the rating of the generator. This step ensures that the system provides power to the highest priority loads if and when the total load on the generator falls, such as when a device is turned off, such as is the case with a microwave oven. The system ensures that when the total overall load decreases, the system activates the highest priority loads first and only activates lower priority loads when the lower priority loads would not exceed the rating of the standby generator.

To continue the illustrative example described above, the system determines whether the relay to the water heater 22 connected to the second priority output can be closed to supply power to the water heater 22. In such a calculation, the load connected to the priority outputs 3-8 are eliminated from the calculation since the priority for the system is to activate the water heater 22 while shedding the load connected to the priority outputs 3-8. If the system determines in step 114 that the relay for the highest priority circuit can be closed, the system closes the relay in step 116. Once the relays have been closed, the system returns to step 106 to determine which of the relays can be closed without exceeding the rating for the generator.

In the manner described above, although various loads are connected to priority circuits based upon their importance during a load shed procedure, the transfer switch control unit is capable of activating lower priority loads if the lower priority loads will not exceed the threshold for the generator. The system continues to monitor the load on the generator and will reactivate the highest priority turned off when the highest priority turned off can be safely activated due to other reductions in energy consumption.

Figure 3:
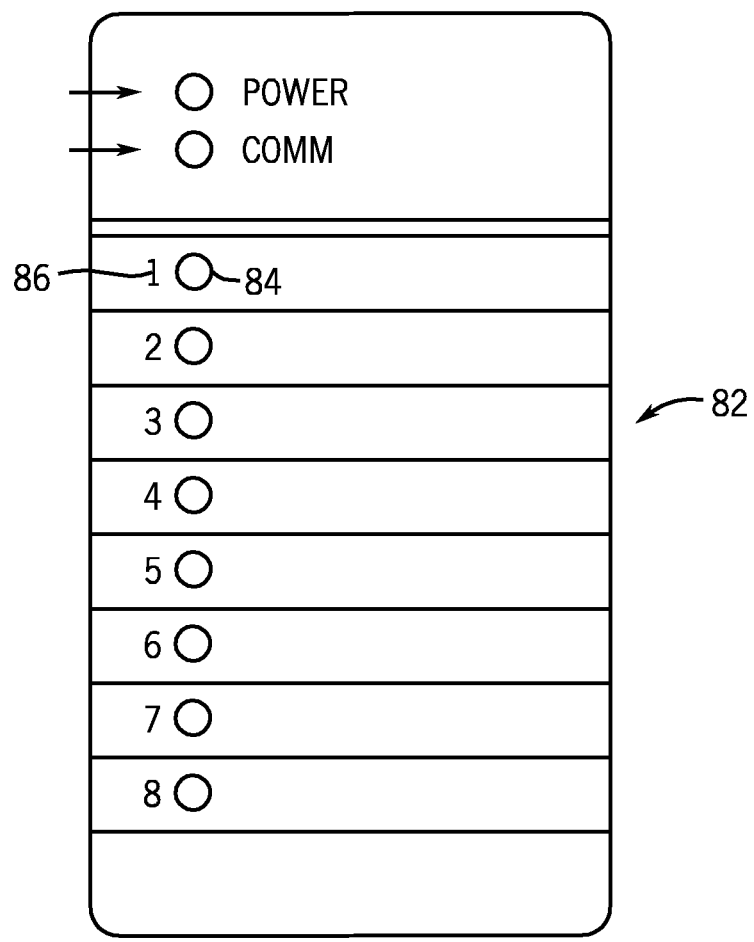
FIG. 3 is an illustration of the status display of the prioritized loads.

Referring to FIG. 3, the transfer switch 16 preferably includes a display 82 that has a plurality of individual indicator lights 84 positioned adjacent to a series of numeric indicators 86 representing each of the eight priority outputs. Each of the indicator lights 84 is illuminated when power is being supplied to the priority circuit associated with the indicator number 86.

In addition to the features described above, the transfer switch control unit 38 can also be configured to include memory regarding the power consumption of each individual load when the load is energized. As an example, the transfer switch control unit monitors the amount of power drawn when the air conditioner 24 is initially energized. Thus, when the air conditioner 24 is about to be energized, the transfer switch control unit 38 will shed enough load for the air conditioner to turn on without overloading the generator. After the in-rush of power consumption upon energization of the air conditioner, the power consumption of the air conditioner recedes and the transfer switch control unit 38 can again activate additional lower priority loads.

During step 108, in which the system determines whether any lower priority circuits can be closed, if the next lowest priority load will exceed the capacity of the generator, the system will proceed to the next lowest priority load to determine if this load can be turned on. Thus, as an illustrative example with respect to FIG. 2, the load applied to the third priority circuit 44 and the fourth priority circuit 46 may be turned off while the load applied to the fifth priority circuit 48 may be active. Thus, the transfer switch control unit 38 can selectively activate loads to make sure the combined load does not exceed the rating of the generator.

We claim:

1. A method for managing a plurality of electric loads powered by a standby generator, the method comprising the steps of:
   interconnecting each of the plurality of electric loads to the generator through an interconnect device that is operable to selectively connect and disconnect the electric load from the generator;
   assigning a priority value to each of the electric loads from a lowest priority value to a highest priority value;
   providing a control unit in communication with each of the interconnect devices to control the connection of each of the electric loads to the generator;
   monitoring a combined load on the generator in the control unit;
   selectively disconnecting the electric loads from the generator in a sequential order based on the priority value assigned to each load, wherein the loads having the lowest priority value are sequentially disconnected from the generator by the control unit until the combined load on the generator falls below a rated value for the generator;
   predicting the additional load on the generator for each of the electric loads disconnected from the generator; and
   selectively reconnecting one or more of the electric loads having priority values lower than the electric load having the highest priority value that is disconnected from the generator when the combination of the predicted additional load and the combined load remains below the rated value of the generator.

2. The method of claim 1 wherein the control unit is contained within a transfer switch positioned between the generator and a main breaker panel.

3. The method of claim 2 wherein the interconnect devices are contained within the transfer switch.

4. The method of claim 2 wherein the interconnect devices are positioned external to the transfer switch.

5. The method of claim 1 wherein the rated value for the generator is a predetermined percentage of the maximum generator output.

6. The method of claim 1 further comprising the step of monitoring the power drawn by each of the electric loads during operation and storing a power draw value for each of the electric loads in the control unit.

7. The method of claim 1 wherein the control unit monitors the load on the generator.

8. A load management system for managing one or more electric loads powered by a standby generator, the system comprising:
   a transfer switch coupled to the standby generator;
   a plurality of interconnect devices each positioned between one of the loads and the generator, wherein each interconnect device is operable to selectively connect and disconnect the electric load from the generator;
   a control unit in communication with each of the interconnect devices to selectively control the interconnect devices, the control unit being configured to:
      assign a priority value to each of the electric loads from a lowest priority value to a highest priority value;
      monitor a combined load on the generator;
      selectively disconnect the electric loads from the generator in a sequential order based on the priority value assigned to each load, wherein the loads having the lowest priority values are sequentially disconnected until the combined load on the generator falls below a rated value for the generator;
      predicting the additional load on the generator for each of the electric loads disconnected from the generator; and;
      selectively re-connecting one or more of the electric loads having a priority value lower than the electric load having the highest priority value that is disconnected from the generator when the combination of the predicted additional load and the combined load remains below the rated value of the generator.

9. The load management system of claim 8 wherein the control unit is contained within the transfer switch and the transfer switch is positioned between the generator and a main breaker panel.

10. The load management system of claim 9 wherein the interconnect devices are each contained within the transfer switch.

11. The load management system of claim 9 wherein the interconnect devices are positioned external to the transfer switch.

12. The load management of claim 8 wherein the rated value for the generator is a predetermined percentage of a maximum generator output.

13. The load management system of claim 1 wherein the control unit monitors the power drawn by each of the electric loads and stores a power draw value for each electric load.

14. A method of managing a plurality of electric loads powered by a standby generator, the method comprising the steps of:
   assigning a priority value to each of the electric loads from a lowest priority value to a highest priority value;
   monitoring a combined load on the generator in a control unit;
   selectively disconnecting the electric loads from the generator in a sequential order based on the priority value assigned to each load, wherein the electric loads having the lowest priority value are sequentially disconnected until the combined load on the generator falls below a rated value for the generator;
   predicting the additional load on the generator for each of the electric loads disconnected from the generator; and
   selectively reconnecting one or more of the electric loads having a priority value lower than the highest priority value of the electric load that is disconnected from the generator when the combination of the predicted additional load and the combined load remains below the rated value of the generator.

15. The method of claim 14 further comprising the step of monitoring the power drawn by each of the loads and storing a power draw for each of the loads in the control unit.

16. The method of claim 14 wherein each of the electric loads is connected to a priority output of the transfer switch, wherein each of the priority outputs are assigned a priority value.

17. The method of claim 16 wherein the control units selectively controls each of the priority outputs.

18. The method of claim 14 wherein the control unit is contained within a transfer switch positioned between the generator and a main breaker panel.

* * * * *